United States Patent Office 3,511,529
Patented May 12, 1970

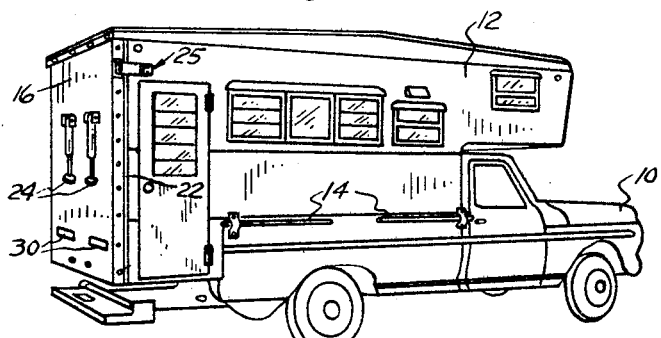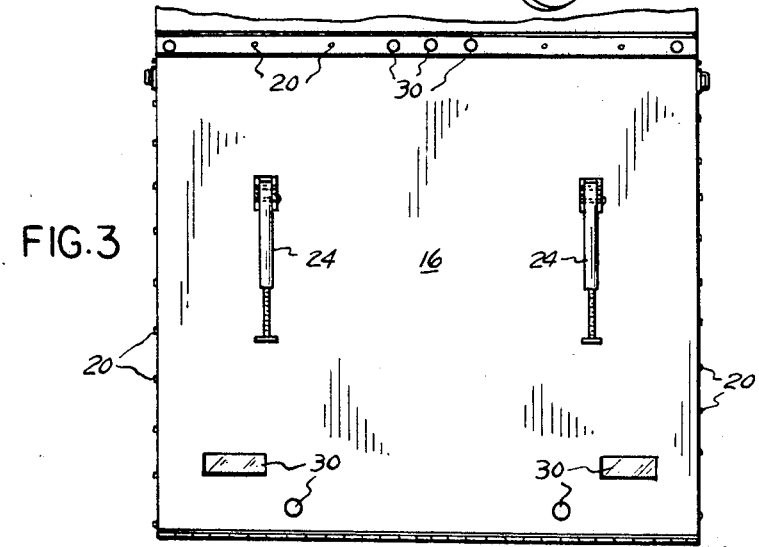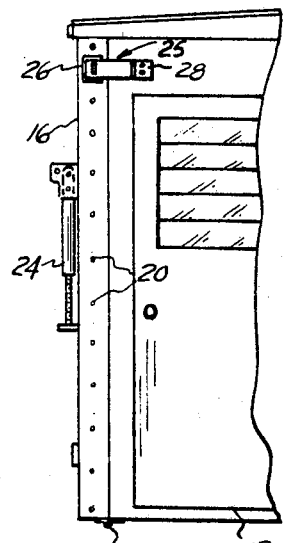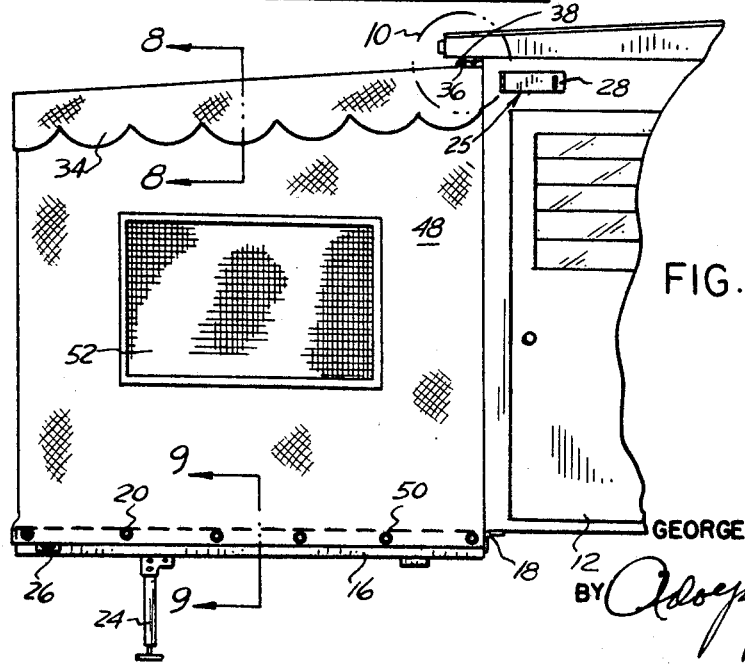
INVENTOR
GEORGE F. CUTSINGER
BY Adolph G. Martin
ATTORNEY May 12, 1970   G. F. CUTSINGER   3,511,529
COLLAPSIBLE ROOM FOR PORTABLE CAMPERS AND TRAILERS
Filed June 3, 1968   2 Sheets-Sheet 2
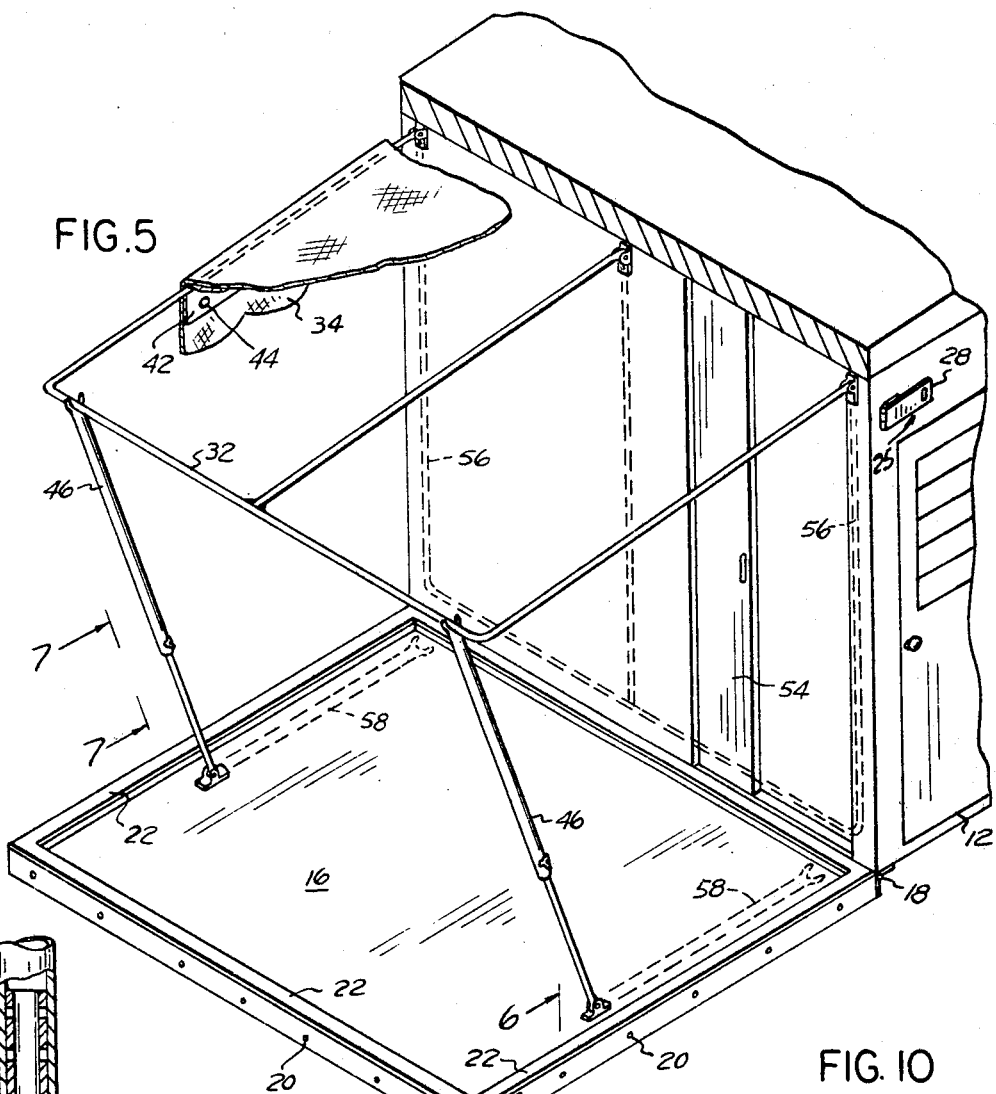
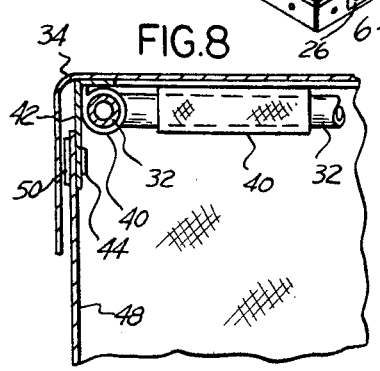
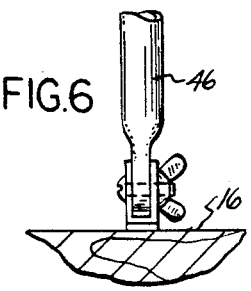
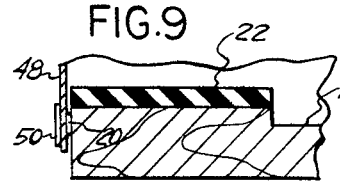
INVENTOR
GEORGE F. CUTSINGER
BY
ATTORNEY

3,511,529
COLLAPSIBLE ROOM FOR PORTABLE CAMPERS AND TRAILERS
George F. Cutsinger, 6482 Brace, Detroit, Mich. 48228
Filed June 3, 1968, Ser. No. 734,137
Int. Cl. B60p 3/32
U.S. Cl. 296—23                                   1 Claim

ABSTRACT OF THE DISCLOSURE

An additional room attachable to portable campers and trailers which is completely collapsible so as to facilitate convenient storage and travel.

BACKGROUND OF THE INVENTION

This invention relates generally to campers and trailers of the type suitable for use respectively with pick-up trucks and passenger vehicles. The primary consideration in trailer and camper construction is to provide additional usable space without increasing proportionately the outside dimensions. To achieve this objective, certain manufacturers have appended collapsible structures to their basic unit to provide lounging, dining or sleeping facilities, which can be compacted for convenience in traveling. Such accommodations, however, are usually cumbersome to operate, and detract materially from the general appearance of the trailer or camper. This explains why such collapsible auxiliary structures have failed to gain public acceptance and become standard equipment on trailers and campers.

SUMMARY OF THE INVENTION

This invention consists of a floor panel pivotally connectable to a trailer or camper so as to be swingable into a position adjacent the rear of such unit. A collapsible awning is supportable over the floor panel when the latter is in a horizontal position. Ventilated side curtains are attachable to the awning and floor panel so as to enclose the area and provide an additional room for use as an auxiliary dining, lounging or sleeping facility.

BRIEF DESCRIPTION OF THE INVENTION

FIG. 1 is a perspective view showing the applicant's invention applied to a portable camper 12 mounted on a pick-up truck 10.

FIG. 2 is an enlarged fragmentary side view showing the fasteners 25 and the adjustable feet 24 on the floor panel 16.

FIG. 3 is an enlarged elevation view showing the hinge 18 attaching the floor panel 16 to the camper 12.

FIG. 4 is an enlarged fragmentary side view showing the floor panel 16 in a lowered position, and the awning 34 extended with the side curtains 48 attached.

FIG. 5 is a fragmentary rear perspective view of the construction in FIG. 4, with a portion of the awning 34 torn away so as to show the supporting frame 32.

FIG. 6 is an enlarged fragmentary section view, taken substantially on plane 6—6 in FIG. 5, showing the pivotal attachment of the telescopic members 46 to the floor panel 16.

FIG. 7 is an enlarged fragmentary view, taken substantially on plane 7—7 in FIG. 5, showing the telescoping member 46 with portions broken away to show structural details.

FIG. 8 is a section view, taken substantially on plane 8—8 in FIG. 4, showing the drop section 42 on the awning 34 and the buttons 44 thereon for attachment to the snap rings 50 on the side curtains 48.

FIG. 9 is an enlarged section view, taken substantially on plane 9—9 in FIG. 4, showing the buttons 20 on the floor panel 16 for attachment to the snap rings 50 on the side curtains 48.

FIG. 10 is an enlarged fragmentary side view of the construction enclosed by circle 10 in FIG. 4, showing the retainer rib 36 on the awning 34 secured in the slotted tubular member 38.

DETAILED DESCRIPTION OF THE PREFERRED EMBODIMENT

Construction

For a more detailed description of the invention, reference is made to the drawing in which numeral 10 designates a pick-up truck having a portable camper 12 attached thereto in the conventional manner. Adjustable legs 14 are provided on each side of the portable camper 12 for supporting it independently of the pick-up truck 10. A floor panel 16 is mounted on the rear end of the portable camper 12 by a hinge 18, and provided with a series of attachment buttons 20 around the outer edges.

A resilient sealing member 22 is provided along the upper periphery of the floor panel 16. A pair of adjustable feet 24 are pivotally mounted on the lower side of the floor panel 16 for supporting it in a lowered or lateral position, as shown in FIG. 4. A fastener 25, having a ring 26 and a hasp 28 attached respectively to the floor panel 16 and the camper 12, is provided to lock the floor panel 16 in a raised position, as shown in FIGS. 1 and 2.

Customary signal lights, such as 30, are provided on the lower side of the floor panel 16, and connected to the vehicle lighting system in the conventional manner. A frame 32 pivotally attached to the portable camper 12, is covered with an awning 34 of canvas or other flexible material. A bead 36 on the rear edge of the awning 34 is removably secured in a slotted tubular member 38 mounted on the portable camper 12, as shown in FIGS. 4 and 10.

A series of tunnels 40 are provided around the under side of the awning 34 for securing it to the frame 32. An interior drop section 42, along the front and both sides of the awning 34, has mounted therein spaced attachment buttons 44. A pair of adjustable telescopic members 46, pivotally attached to the floor panel 16, support the frame 32 when it is in extended position, as shown in FIG. 5.

Side curtains 48 have spaced snap rings 50 along the upper and lower sides thereof removably secured to the attachment buttons 44 and 20 on the drop section 42 and floor panel 16 respectively. Ventilating and viewing panels, such as 52, are provided in the side curtains 48. A sliding door 54 is placed in the rear end of the camper unit 12 to provide convenient ingress and egress from the applicant's auxiliary structure.

This completes a description of the structural details of the applicant's invention; however, to facilitate a more thorough comprehension of the subject matter herein presented, a discussion is next directed to the manner in which the structure is used to perform its intended function.

Use and operation

In using the applicant's auxiliary structure, the camper unit 12 is preferably removed from the pick-up truck 10 and supported on the ground by means of the adjustable legs 14. The floor panel 16 is then unlocked from its secured or raised position, as shown in FIGS. 1, 2 and 3, by removing the hasp 28 from the ring 26. The floor panel 16 may then be swung to its lowered position, shown in FIGS. 4 and 5, and the adjustable feet 24 manipulated to support the floor panel 16 in a horizontal position.

The frame 32 and the attached awning 34 are next elevated from the broken line position 56, adjacent the camper unit 12, to the extended position shown in FIGS. 4 and 5.

The telescopic members 46 are then pivoted from the broken line position 58, adjacent the floor panel 16, to the full line position shown in FIG. 5. The telescopic members 46 are adjusted and manipulated to engage the frame 32 so as to support the same over the floor panel 16, as shown in FIGS. 4 and 5.

The side curtains 34 can then be applied by engaging the snap rings 50 thereon with the attachment buttons 20 and 44 on the floor panel 16 and drop-section 42 respectively, as shown in FIGS. 8 and 9. The enclosure is thereupon ready to serve as an auxiliary sleeping, dining or lounging facility, with ready access from inside the camper unit 12 through the sliding door 54. When it is desired to collapse and compact the applicant's auxiliary structure to facilitate storage or travel, the previously described procedure is followed in reverse sequence.

Based upon the foregoing discussion, the applicant is of the opinion that his invention has fulfilled a long-felt need in the field of campers and trailers, and that he has made a valuable contribution to the related art. However, while the invention was described with reference to the structural details of a single embodiment, the principles involved are susceptible of numerous other practical adaptations.

Therefore, I claim as new, and desire to secure by Letters Patent:

1. A collapsible structure for portable camper and trailer units, such structure comprising a floor panel pivotally attachable to the portable units and having a raised and a lowered position, an awning attachable to the portable units and having an extended and a retracted position, adjustable members pivotally attached to the floor panel for holding the awning in its extended position over the floor panel when the latter is in its lowered position, at least one adjustable foot pivotally attached to the floor panel for supporting the floor panel in its lowered position, a resilient member around the floor panel for entering into a water-tight engagement with an outer wall of the portable unit when the floor panel is in its raised position, a series of fasteners around both the floor panel and the awning, and side curtains removably attachable to the fasteners on the floor panel and the awning when the latter are in their extended and lowered positions respectively so as to seal effectively the enclosed area.

References Cited

UNITED STATES PATENTS

| | | | |
|---|---|---|---|
| 3,351,373 | 11/1967 | Christin | 296—23 |
| 2,853,338 | 9/1958 | Stanley | 296—23 |
| 1,826,136 | 10/1931 | Jordan | 296—23 |

PHILIP GOODMAN, Primary Examiner

U.S. Cl. X.R.

52—69